US010138904B2

(12) United States Patent
Pearson et al.

(10) Patent No.: US 10,138,904 B2
(45) Date of Patent: Nov. 27, 2018

(54) INLET PARTICLE SEPARATOR SYSTEM WITH HIGH CURVATURE HUB

(71) Applicant: HONEYWELL INTERNATIONAL INC., Morris Plains, NJ (US)

(72) Inventors: John Taylor Pearson, Phoenix, AZ (US); Yogendra Yogi Sheoran, Scottsdale, AZ (US); Bruce Dan Bouldin, Phoenix, AZ (US); Zedic Daniel Judd, Phoenix, AZ (US); Eduardo Guerra, Queen Creek, AZ (US); David Chou, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 245 days.

(21) Appl. No.: 14/988,988

(22) Filed: Jan. 6, 2016

(65) Prior Publication Data

US 2017/0191503 A1    Jul. 6, 2017

(51) Int. Cl.
*B01D 45/00* (2006.01)
*F04D 29/70* (2006.01)
*B01D 45/16* (2006.01)
*B01D 45/08* (2006.01)
*F04D 29/52* (2006.01)
(Continued)

(52) U.S. Cl.
CPC .......... *F04D 29/701* (2013.01); *B01D 45/08* (2013.01); *B01D 45/12* (2013.01); *B01D 45/16* (2013.01); *B64D 33/02* (2013.01); *F02C 7/052* (2013.01); *F04D 29/522* (2013.01); *F04D 29/542* (2013.01); *F04D 29/545* (2013.01); *B64D 2033/0246* (2013.01); *F02C 7/05* (2013.01);
(Continued)

(58) Field of Classification Search
CPC .... F04D 29/701; F04D 29/522; F04D 29/545; F04D 29/542; B64D 33/02; B64D 2033/0246; B01D 45/12; B01D 45/08; B01D 45/16; F05D 2250/71; Y02T 50/671; F02C 7/05; F02C 7/052
See application file for complete search history.

(56) References Cited

U.S. PATENT DOCUMENTS 3,766,719 A    10/1973   McAnally, III
4,250,703 A    2/1981   Norris et al.
(Continued)

OTHER PUBLICATIONS

Extended EP Search Report for Application No. 16195638.8-1370 dated May 26, 2017.

*Primary Examiner* — Dung H Bui
(74) *Attorney, Agent, or Firm* — Lorenz & Kopf, LLP

(57) ABSTRACT

An inlet particle separator system for a vehicle engine includes a hub section, a shroud section, and a splitter. The hub section has a hub outer surface that diverges, relative to the axis of symmetry, to a hub apex. The shroud section has a shroud inner surface that surrounds, and is spaced apart from, at least a portion of the hub section to define a main flow passageway between the hub outer surface and the shroud inner surface. The splitter is disposed downstream of the air inlet and extends into the main flow passageway to divide the main flow passageway into a scavenge flow path and an engine flow path. The hub section and the shroud section are configured such that the cross sectional flow area of the main flow passageway decreases downstream of the air inlet to define a throat section that is disposed upstream of the hub apex.

18 Claims, 5 Drawing Sheets

(51) Int. Cl.
*F04D 29/54* (2006.01)
*B01D 45/12* (2006.01)
*B64D 33/02* (2006.01)
*F02C 7/052* (2006.01)
*F02C 7/05* (2006.01)

(52) U.S. Cl.
CPC ......... *F05D 2250/71* (2013.01); *Y02T 50/671* (2013.01)

(56) References Cited

U.S. PATENT DOCUMENTS

| | | | |
|---|---|---|---|
| 4,346,860 A | | 8/1982 | Tedstone |
| 4,425,756 A | | 1/1984 | Ballard et al. |
| 4,527,387 A | | 7/1985 | Lastrina et al. |
| 4,592,765 A | * | 6/1986 | Breitman ............ F02C 7/05 415/121.2 |
| 4,844,382 A | | 7/1989 | Raisbeck |
| 4,928,480 A | | 5/1990 | Oliver et al. |
| 5,039,317 A | * | 8/1991 | Thompson ........... B01D 45/16 55/306 |
| 5,139,545 A | | 8/1992 | Mann |
| 6,499,285 B1 | | 12/2002 | Snyder |
| 6,702,873 B2 | | 3/2004 | Hartman |
| 7,296,395 B1 | | 11/2007 | Hartman et al. |
| 7,596,938 B2 | | 10/2009 | Bart et al. |
| 7,678,165 B2 | | 3/2010 | Tingle et al. |
| 7,802,433 B2 | | 9/2010 | Higgins |
| 7,854,778 B2 | | 12/2010 | Groom et al. |
| 7,927,408 B2 | * | 4/2011 | Sheoran ............... B01D 45/04 55/306 |
| 9,314,723 B2 | * | 4/2016 | Judd ..................... B01D 45/04 |
| 9,638,103 B2 | * | 5/2017 | Howe .................... F02C 7/052 |
| 2003/0196548 A1 | | 10/2003 | Hartman |
| 2009/0139398 A1 | | 6/2009 | Sheoran et al. |
| 2014/0076159 A1 | | 3/2014 | Judd et al. |
| 2014/0144123 A1 | * | 5/2014 | Judd ..................... B01D 45/04 60/39.092 |
| 2014/0190347 A1 | | 7/2014 | Wong et al. |
| 2015/0030435 A1 | | 1/2015 | Howe et al. |
| 2015/0040535 A1 | | 2/2015 | Judd et al. |
| 2015/0198090 A1 | | 7/2015 | Howe et al. |

* cited by examiner

# INLET PARTICLE SEPARATOR SYSTEM WITH HIGH CURVATURE HUB

STATEMENT REGARDING FEDERALLY SPONSORED RESEARCH OR DEVELOPMENT

This invention was made with Government support under W911W6-08-2-0001 awarded by U.S. Army AATE. The Government has certain rights in the invention.

TECHNICAL FIELD

The present invention generally relates to an inlet particle separator system for a vehicle engine, and more particularly relates to an inlet particle separator system with a high curvature hub to improve fine particulate separation efficiency.

BACKGROUND

During operation of an aeronautical vehicle, air is induced into an engine and, when mixed with a combustible fuel, is used to generate energy to propel the vehicle. The induced air may contain undesirable particles, such as sand and dust, which can degrade engine components. In order to prevent or at least minimize such degradation, many aeronautical vehicles use an inlet particle separator system, disposed upstream of the engine, to remove at least a portion of the undesirable particles.

A conventional inlet particle separator typically includes a duct system having a fluid passageway that transitions into a scavenge flow path and an engine flow path. Air that is induced into the fluid passageway may have particles suspended therein. The inertia of relatively larger ones of the suspended particles tends to cause these particles to travel in a straight line rather than follow the fluid passageway. Because of the manner in which the inlet particle separator is configured, most of the suspended particles tend to flow into the scavenge flow path rather curve into the engine flow path. As such, relatively clean air is directed into the engine, and contaminated air, which has the particles suspended therein, is directed through the scavenge flow path and is discharged.

Conventional inlet particle separators, such as those described above, operate at relatively high efficiencies for relatively large particles (e.g., >80 microns). However, for relatively small particles (e.g., <80 microns), the efficiencies can be relatively low, resulting in a significant amount of these relatively small particles being ingested into the engine. These relatively small particles, while being potentially less troublesome than the relatively large particles, can still have some deleterious effects. For example, these particles can plug secondary flow lines and/or can melt and form glass on relatively hot engine components, such as the combustor, which can significantly reduce engine performance or have other undesirable effects.

Hence, there is a need for an inlet particle separator system that increases the separation efficiency of relatively small particles from engine inlet with minimal increase to core pressure loss. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an inlet particle separator system for a vehicle engine having an axis of symmetry about which components that comprise the vehicle engine rotate includes a hub section, a shroud section, and a splitter. The hub section has a hub outer surface that diverges, relative to the axis of symmetry, to a hub apex. The shroud section has a shroud inner surface that surrounds, and is spaced apart from, at least a portion of the hub section to define a main flow passageway between the hub outer surface and the shroud inner surface. The main flow passageway has an air inlet and a cross sectional flow area. The splitter is disposed downstream of the air inlet and extends into the main flow passageway to divide the main flow passageway into a scavenge flow path and an engine flow path. The hub section and the shroud section are configured such that the cross sectional flow area of the main flow passageway decreases downstream of the air inlet to define a throat section, and the throat section is disposed upstream of the hub apex.

In another embodiment, an inlet particle separator system for a vehicle engine having an axis of symmetry about which components that comprise the vehicle engine rotate includes a hub section, a shroud section, and a splitter. The hub section has a hub outer surface that diverges, relative to the axis of symmetry, to a hub apex. The shroud section has a shroud inner surface that surrounds, and is spaced apart from, at least a portion of the hub section to define a main flow passageway between the hub outer surface and the shroud inner surface. The main flow passageway has an air inlet and a cross sectional flow area. The splitter is disposed downstream of the air inlet and extends into the main flow passageway to divide the main flow passageway into a scavenge flow path and an engine flow path. The hub section and the shroud section are configured such that the cross sectional flow area of the main flow passageway decreases downstream of the air inlet to define a throat section. The throat section is disposed upstream of the hub apex. The shroud section upstream of the air inlet has a shroud radius ($R_{SHROUD}$) relative to the axis of symmetry. The hub section upstream of the air inlet has a hub radius ($R_{HUB}$) relative to the axis of symmetry. A difference radius is defined as $\Delta R = R_{SHROUD} - R_{HUB}$. A region where the shroud section begins increasing in diameter has a shroud radius of curvature ($R_S$). The forward protruding section has a hub radius of curvature ($R_H$). The hub radius of curvature has a center of curvature (C). The center of curvature (C) of the forward protruding section is disposed at a center of curvature radius ($R_C$) relative to the axis of symmetry. $R_S/\Delta R$, $R_H/\Delta R$, and $R_C/R_{SHROUD}$ are set to establish desired performance criteria.

In yet another embodiment, an inlet particle separator system for a vehicle engine having an axis of symmetry about which components that comprise the vehicle engine rotate includes a hub section, a shroud section, a splitter, and an air pump. The hub section has a hub outer surface that diverges, relative to the axis of symmetry, to a hub apex. The shroud section has a shroud inner surface that diverges, relative to the axis of symmetry, to a shroud apex and that surrounds, and is spaced apart from, at least a portion of the hub section to define a main flow passageway between the hub outer surface and the shroud inner surface. The main flow passageway has an air inlet and a cross sectional flow area. The splitter is disposed downstream of the air inlet and extends into the main flow passageway to divide the main flow passageway into a scavenge flow path and an engine flow path. The air pump is in fluid communication with the scavenge flow path and is configured to draw air through the scavenge flow path and the hub suction flow passage. The hub section and the shroud section are configured such that the cross sectional flow area of the main flow passageway decreases downstream of the air inlet to define a throat section. The throat section is disposed upstream of the hub apex, and the shroud apex is axially offset from the hub apex.

Furthermore, other desirable features and characteristics of the inlet particle separator system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
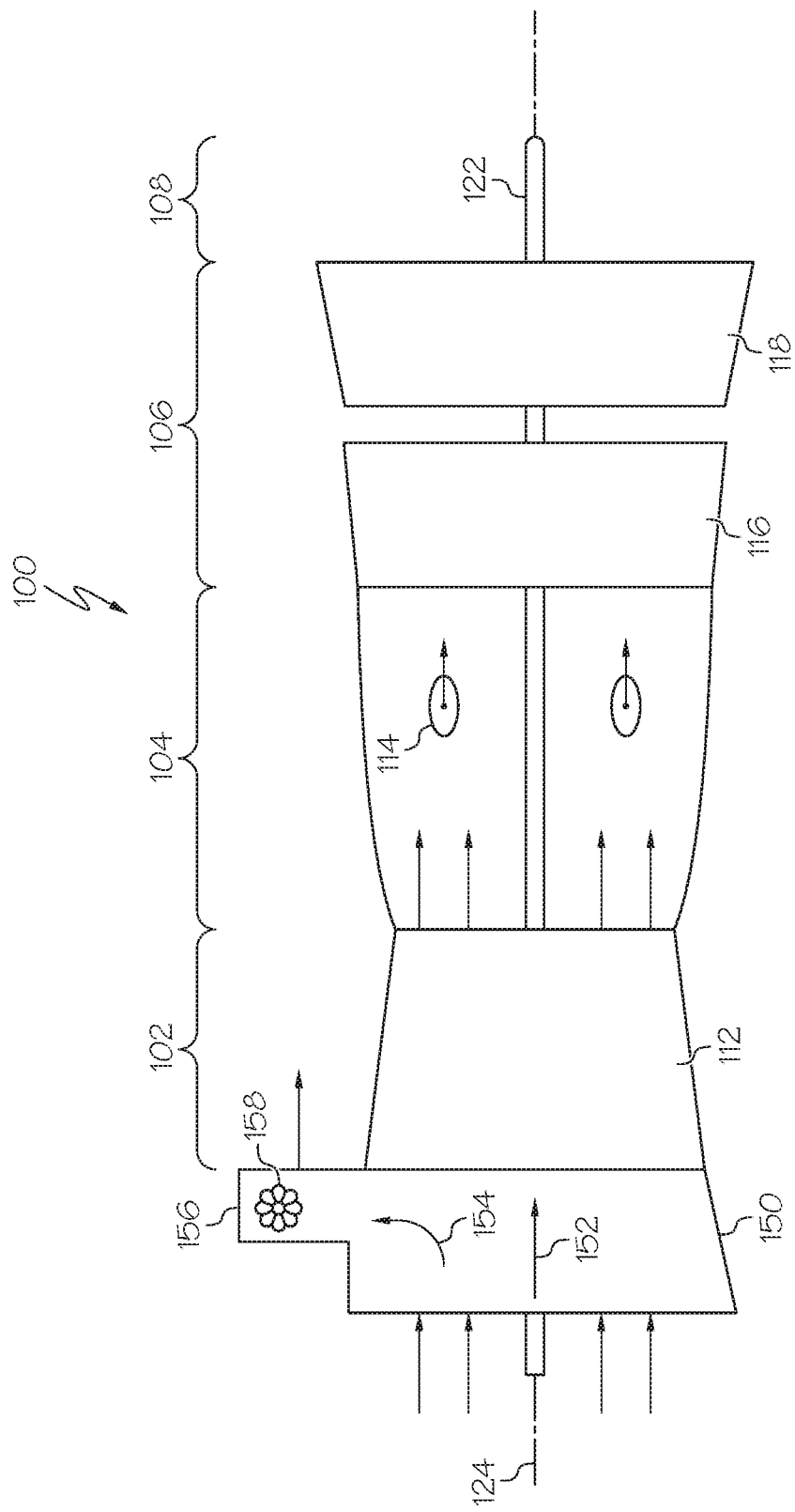
FIG. 1 is a functional block diagram of an exemplary gas turbine engine.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102, which may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 104. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high pressure turbine 116 and a low power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122, which lies along an axis of symmetry 124. The combusted air mixture is then exhausted via the exhaust section 108. The power shaft 122 may be used to drive various devices within the engine or vehicle. For example, in the context of a helicopter, the power shaft may be used to drive one or more rotors.

As FIG. 1 further depicts, the gas turbine engine 100 also includes an inlet particle separator system 150. The inlet particle separator system 150 is coupled to, and disposed upstream of, the compressor section 102. The air that the compressor section 102 draws into the engine 100 first enters the inlet particle separator system 150. The inlet particle separator system 150, as will be described in more detail further below, is configured to separate the air that is drawn into the engine 100 into compressor inlet air 152 and scavenge air 154. The compressor inlet air 152 is drawn into the compressor section 102, and the scavenge air 154 is drawn into, for example, a scavenge scroll 156 via, for example, an air pump 158 (e.g., a blower or the like), and is then discharged into the atmosphere. The particle separator system 150 is additionally configured such that at least a portion of any particulate that is suspended in the air that is drawn into the engine 100 is separated there from and is discharged with the scavenge air 154. Thus, the compressor inlet air 152 that is drawn into the compressor section 102 is relatively clean, particulate free air.

Figure 2:
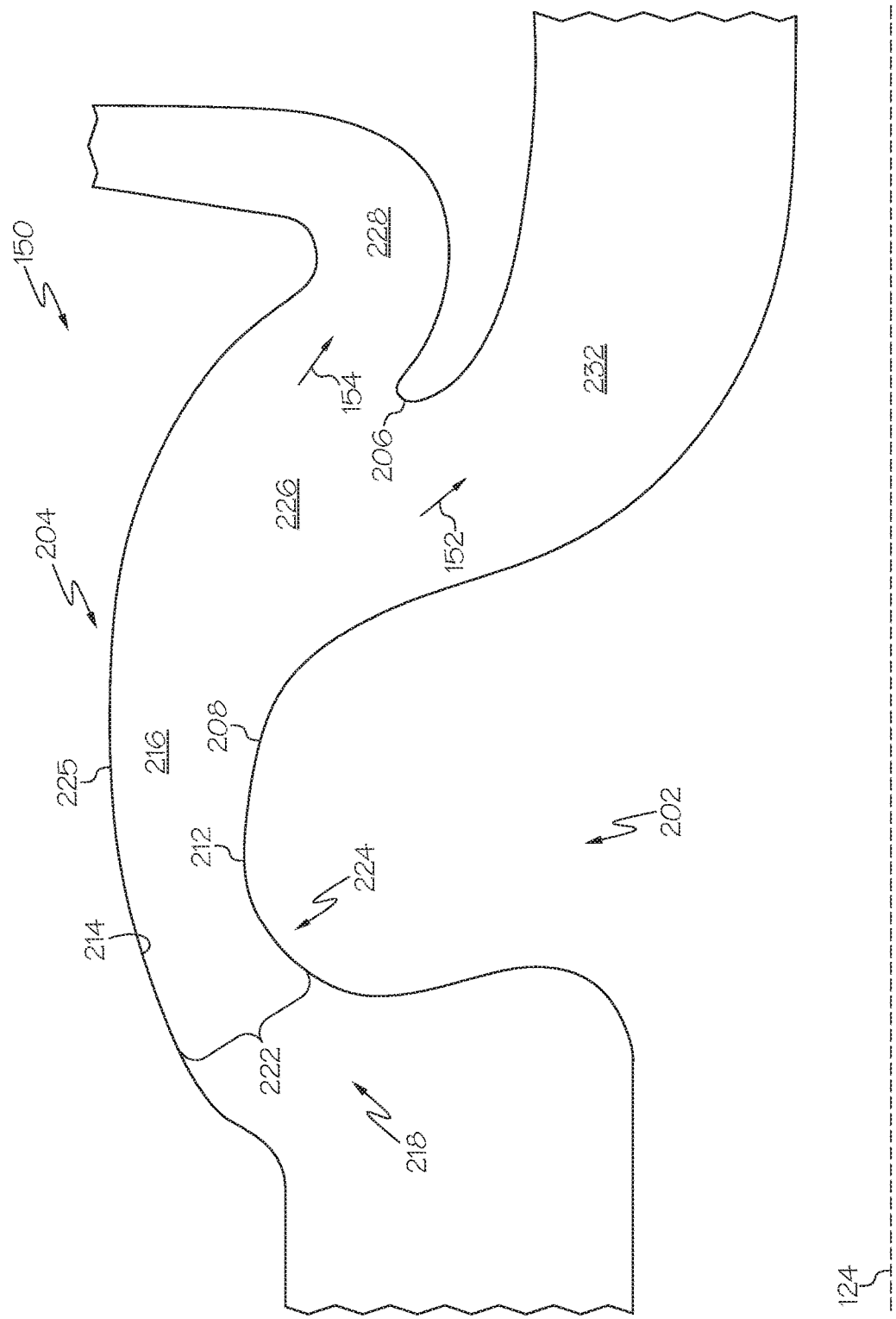
FIG. 2 depicts a partial cross-sectional view of one example embodiments of an inlet particle separator system that may be implemented in the gas turbine engine of FIG. 1.

Referring now to FIG. 2, a cross section view of a portion of the inlet particle separator system 150 is depicted and will be described. The inlet particle separator system 150 includes a hub section 202, a shroud section 204, and a splitter 206. The hub section 202 includes a hub outer surface 208 that diverges, relative to the axis of symmetry 124, to a hub apex 212. The hub apex 212 is the point at which the hub section 202 is at its maximum diameter, relative to the axis of symmetry 124. The shroud section 204 includes a shroud inner surface 214. The shroud section 204 surrounds, and is spaced apart from, at least a portion of the hub section 202 to define a main flow passageway 216 between the hub outer surface 208 and the shroud inner surface 214.

The defined main flow passageway 216 has an air inlet 218 and a cross sectional flow area. The air inlet 218 is configured to receive the air that is drawn into the engine 100. The hub section 202 and the shroud section 204 are configured such that the cross sectional flow area of the main flow passageway 216 decreases downstream of the air inlet 218 to define a throat section 222. The throat section 222, unlike presently known inlet particle separator systems, is disposed upstream of the hub apex 212. The hub section 202 and shroud section 204 may be variously configured to implement this disposition of the throat section 222, but in the depicted embodiment the hub section 204 gradually increases in diameter downstream of the air inlet 218 to the hub apex 212 (e.g., the point of maximum hub diameter). As FIG. 2 also depicts, the hub section 202, at the location where the throat section 222 is defined, has a relatively high curvature, and thus protrudes slightly in the upstream direction. It will be appreciated that the amount of curvature of this forward protruding section 224 may vary. As will be described further below, the amount of curvature may vary and may depend, for example, on the radius of curvature of the forward protruding section 224.

As may be readily apparent from FIG. 2, the shroud section 204 also increases in diameter downstream of the air inlet 218 to a shroud apex 225 (e.g., the point of maximum shroud diameter). The shroud apex 225, unlike presently known inlet particle separator systems, is axially offset from the hub apex 212. More specifically, it is disposed downstream of the hub apex 212. However, similar to various known inlet particle separator systems, the diameters of the hub section 202 and the shroud section 204 downstream of the hub apex 212 and the shroud apex 225, respectively, decrease to define what is referred to herein as the separation section 226.

The separation section 226 is where the air that is drawn into the engine 100, and more specifically the air that is drawn into the air inlet 218, is separated into the compressor inlet air 152 and the scavenge air 154. The separation section 226 is also where the splitter 206 is disposed. In particular, the splitter 206 extends into the main flow passageway 216 downstream of the air inlet 218, and more specifically downstream of the hub apex 212 and the shroud apex 225, and divides the main flow passageway 216 into a scavenge flow path 228 and an engine flow path 232. The scavenge air 154 flows into the scavenge flow path 228, and the compressor inlet air 152 flows into the engine flow path 232.

Figure 3:
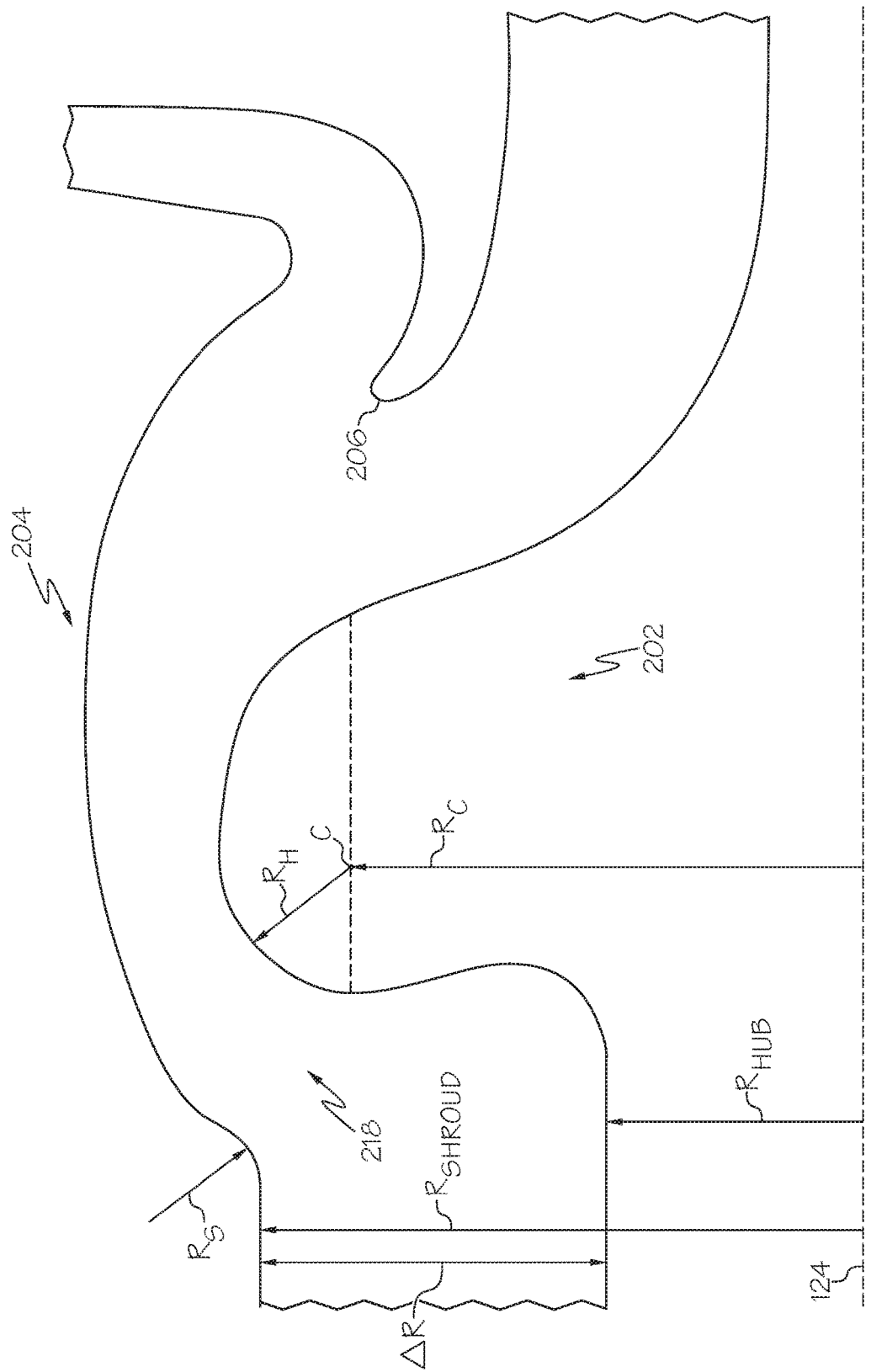
FIG. 3 depicts the example inlet particle separator system of FIG. 2 with various radii illustrated thereon.

Referring now to FIG. 3, various radii associated with the hub and shroud sections 202, 204 are depicted and will now be described. The depicted radii, which are all relative to the axis of symmetry 124, include the radius ($R_{SHROUD}$) of the shroud section 204 upstream of the air inlet 218, the radius ($R_{HUB}$) of the hub section 202 upstream of the air inlet 218, the difference ($\Delta R$) between these two radii, the radius of curvature ($R_S$) of the region where the shroud section 204 begins increasing in diameter, the radius of curvature ($R_H$) of the forward protruding section 224, and the radius ($R_C$) from the axis of symmetry 124 to the center of curvature (C) of the forward protruding section 224. It will be appreciated that the values of these radii may vary. Preferably, however, the ratios of specific ones of these radii are set to establish desired performance. These ratios include $R_S/\Delta R$, $R_H/\Delta R$, and $R_C/R_{SHROUD}$. Although the values of these ratios may vary, the ratio $R_S/\Delta R$ is preferably in the range of about 0.07 to about 0.3, the ratio $R_H/\Delta R$ is preferably in the range of about 0.09 to about 0.6, and the ratio $R_C/R_{SHROUD}$ is preferably in the range of about 0.7 to about 1.0.

Returning now to FIG. 2, as is generally known, air that is drawn into the engine 100 may have particles entrained therein. Due to their inertia, relatively larger (e.g., >80 microns) entrained particles will tend to collect adjacent the shroud section 204, and will thus flow with the scavenge air 154 into the scavenge flow path 228. As previously noted, the scavenge air 154 is drawn into the scavenge scroll 156 via the air pump 158 and is then discharged into the atmosphere. The compressor inlet air 152, which has no (or at least very few) relatively large particles entrained therein, flows into the engine flow path 232, and ultimately into the compressor section 102 (not depicted in FIG. 2).

It was noted above that, at least in some instances, relatively small entrained particles (e.g., <80 microns) can flow with the compressor inlet air 152 into the engine flow path 232, and thus be ingested into the engine. However, because the inlet particle separator system 150 is configured such that the throat section 222 is disposed upstream of the hub apex 212 at a region of relatively high curvature, a large portion of the relatively small particles are prevented, or at least inhibited, from flowing into the compressor section 102. This, at least in part, is because with this configuration air entry into the air inlet 218 is predominantly radial. As such, as the inertia of the particles is increased upon flow through the throat section 222, the particles are directed away from the hub section 202 and toward the shroud section 204.

Figure 4:
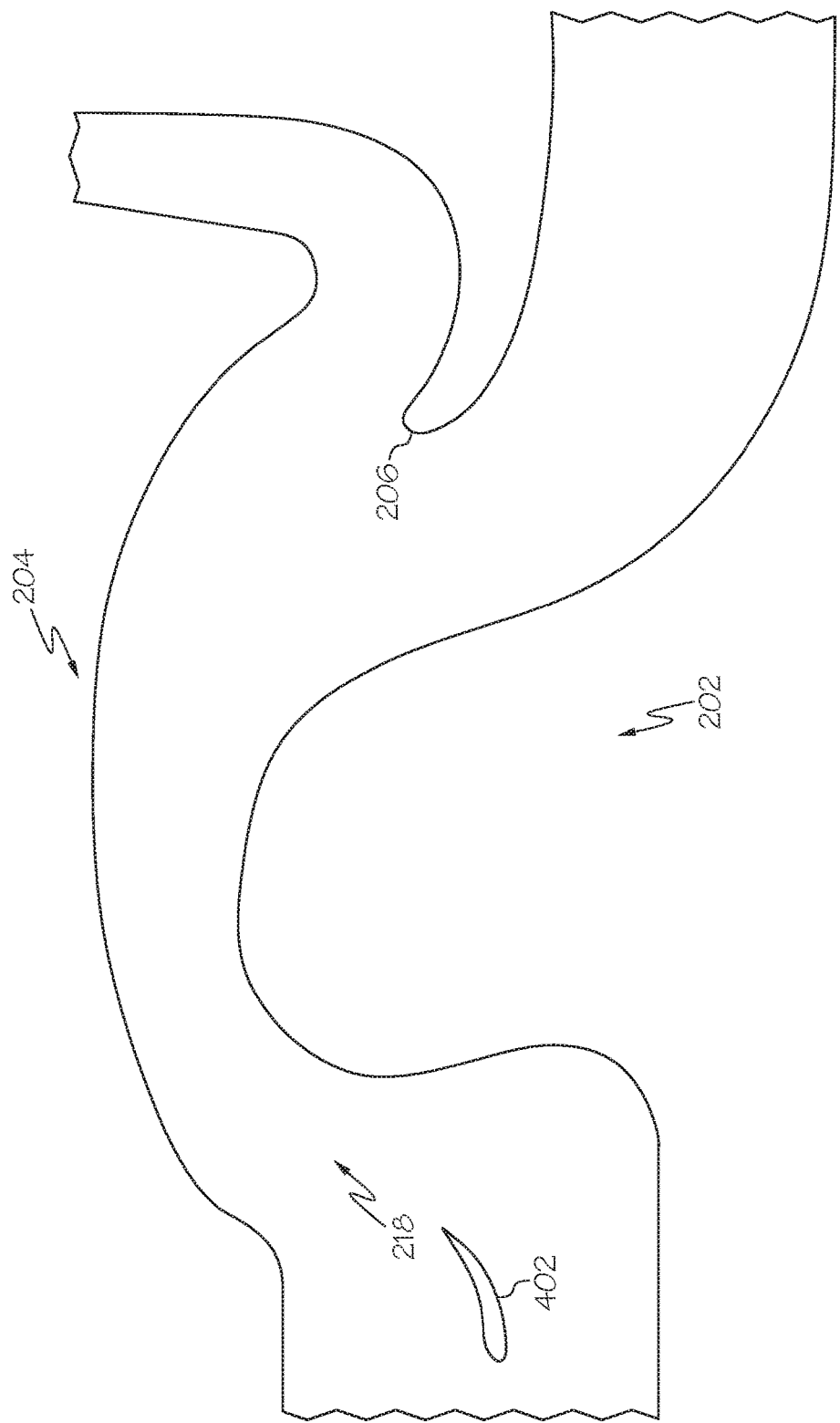
FIGS. 4 and 5 each depict partial cross-sectional views of other example embodiments of an inlet particle separator system that may be implemented in the gas turbine engine of FIG. 1.
Figure 5:
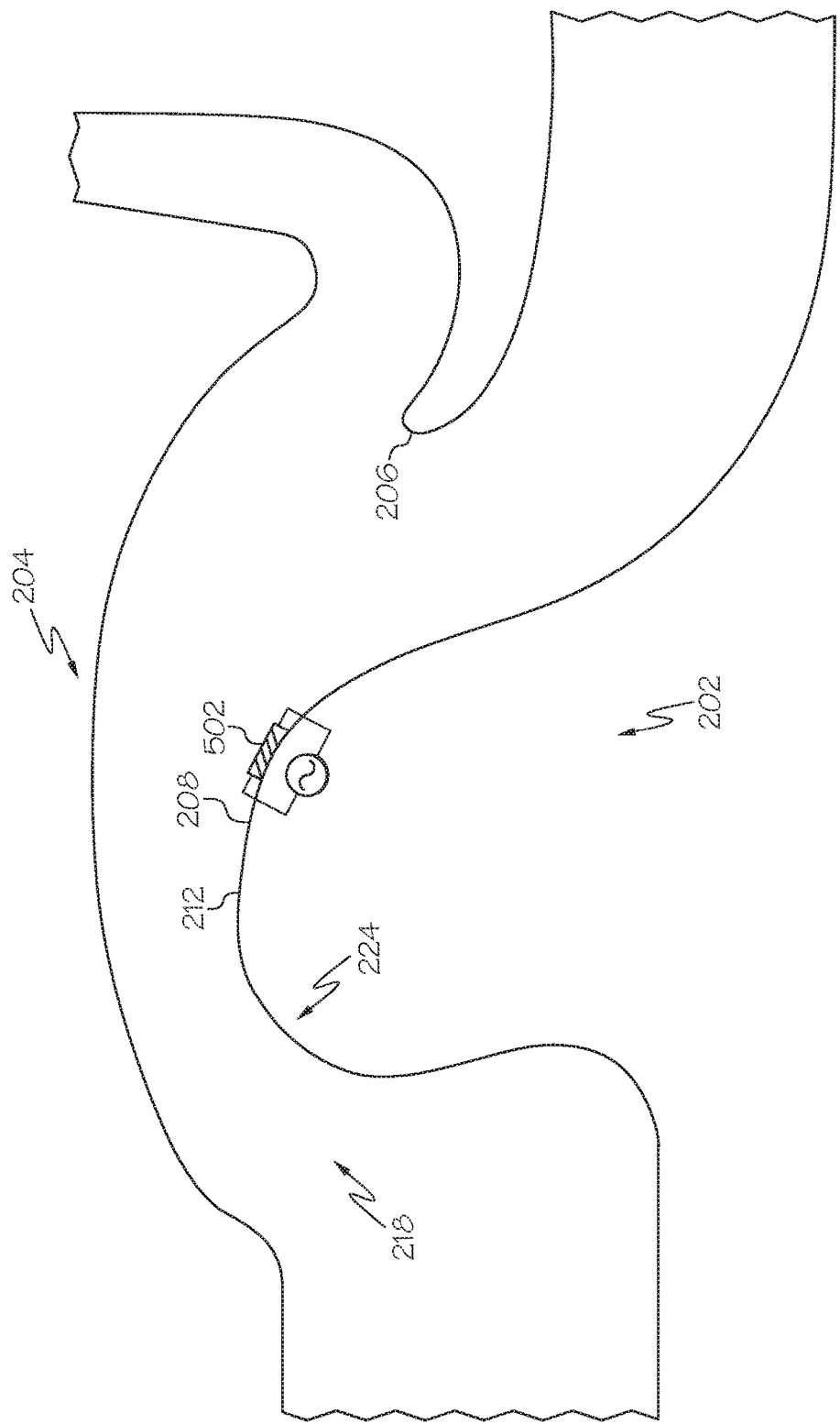

Referring now to FIG. 4, the separation efficiency for relatively small particles can be increased even further by the including a turning vane 402 in the inlet particle separator system 150. The turning vane 402, which is disposed upstream of the air inlet 218, directs even more particles toward the shroud section 204. Moreover, the pressure loss to the scavenge flow path 228 is reduced.

In addition to, or instead of, including the turning vane 402, the inlet particle separator system 150 may, in some embodiments, include one or more plasma flow control actuators 502 (for clarity, only one actuator is depicted). Although the location of the one or more plasma flow actuators 502 may be varied, in the depicted embodiment a single plasma flow control actuator 502 is disposed on the hub outer surface 208 downstream of the hub apex 214. As disclosed in U.S. application Ser. No. 13/951,592, entitled "Plasma Flow Control Inlet Particle Separator System," which is assigned to the assignee of the instant invention, when the one or more plasma flow control actuators 502 are energized at the appropriate amplitude and frequency, a charge is induced in the boundary layer of the air flow, which helps re-attach the air flow where it has a tendency to separate from the surfaces. When one or more flow control actuators 502 are included, the radius of curvature ($R_H$) of the forward protruding section 224 could be further increased, to thereby increase separation efficiency while not increasing pressure loss above acceptable limits.

The inlet particle separator systems 150 described herein increase the separation efficiency of relatively small particles from engine inlet air without increasing (or at least significantly impacting) core pressure loss.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet particle separator system for a vehicle engine having an axis of symmetry about which components that comprise the vehicle engine rotate, the inlet particle separator system comprising:

a hub section having a hub outer surface that diverges, relative to the axis of symmetry, to a hub apex;

a shroud section having a shroud inner surface that surrounds, and is spaced apart from, at least a portion of the hub section to define a main flow passageway between the hub outer surface and the shroud inner surface, the main flow passageway having an air inlet and a cross sectional flow area; and a splitter disposed downstream of the air inlet and extending into the main flow passageway to divide the main flow passageway into a scavenge flow path and an engine flow path, wherein:

the hub section and the shroud section are configured such that the cross sectional flow area of the main flow passageway decreases downstream of the air inlet to define a throat section, the hub section, where the throat section is defined, protrudes in an upstream direction toward the air inlet to define a forward protruding section, and
the throat section is disposed upstream of the hub apex.

2. The system of claim 1, wherein:
the shroud inner surface diverges, relative to the axis of symmetry, to a shroud apex; and
the shroud apex is axially offset from the hub apex.

3. The system of claim 1, further comprising a turning vane disposed upstream of the air inlet.

4. The system of claim 1, further comprising:
a plasma flow control actuator coupled to the hub section and disposed between the air inlet and the splitter.

5. The system of claim 1, further comprising an air pump in fluid communication with the scavenge flow path and configured to draw air through the scavenge flow path.

6. The system of claim 1, wherein:
the shroud section upstream of the air inlet has a shroud radius ($R_{SHROUD}$) relative to the axis of symmetry;
the hub section upstream of the air inlet has a hub radius ($R_{HUB}$) relative to the axis of symmetry;
a difference radius is defined as $\Delta R = R_{SHROUD} - R_{HUB}$;
a region where the shroud section begins increasing in diameter has a shroud radius of curvature ($R_S$);
the forward protruding section has a hub radius of curvature ($R_H$);
the hub radius of curvature has a center of curvature (C);
the center of curvature (C) of the forward protruding section is disposed at a center of curvature radius ($R_C$) relative to the axis of symmetry; and
$R_S/\Delta R$, $R_H/\Delta R$, and $R_C/R_{SHROUD}$ are set to establish desired performance criteria.

7. The system of claim 6, wherein:
$R_S/\Delta R$ is in the range of about 0.07 to about 0.3;
$R_H/\Delta R$ is preferably in the range of about 0.09 to about 0.6; and
$R_C/R_{SHROUD}$ is in the range of about 0.7 to about 1.0.

8. An inlet particle separator system for a vehicle engine having an axis of symmetry about which components that comprise the vehicle engine rotate, the inlet particle separator system comprising:
a hub section having a hub outer surface that diverges, relative to the axis of symmetry, to a hub apex, the hub section protruding in an upstream direction to define a forward protruding section;
a shroud section having a shroud inner surface that surrounds, and is spaced apart from, at least a portion of the hub section to define a main flow passageway between the hub outer surface and the shroud inner surface, the main flow passageway having an air inlet and a cross sectional flow area; and
a splitter disposed downstream of the air inlet and extending into the main flow passageway to divide the main flow passageway into a scavenge flow path and an engine flow path,
wherein:
the hub section and the shroud section are configured such that the cross sectional flow area of the main flow passageway decreases downstream of the air inlet to define a throat section,
the throat section is disposed upstream of the hub apex,
the shroud section upstream of the air inlet has a shroud radius ($R_{SHROUD}$) relative to the axis of symmetry,
the hub section upstream of the air inlet has a hub radius (RHuB) relative to the axis of symmetry,
a difference radius is defined as $\Delta R = R_{SHROUD} - R_{HUB}$,
a region where the shroud section begins increasing in diameter has a shroud radius of curvature ($R_S$),
the forward protruding section has a hub radius of curvature ($R_H$),
the hub radius of curvature has a center of curvature (C),
the center of curvature (C) of the forward protruding section is disposed at a center of curvature radius ($R_C$) relative to the axis of symmetry, and
$R_S/\Delta R$, $R_H/\Delta R$, and $R_C/R_{SHROUD}$ are set to establish desired performance criteria.

9. The system of claim 8, wherein:
$R_S/\Delta R$ is in the range of about 0.07 to about 0.3;
$R_H/\Delta R$ is preferably in the range of about 0.09 to about 0.6; and
$R_C/R_{SHROUD}$ is in the range of about 0.7 to about 1.0.

10. The system of claim 8, wherein:
the shroud inner surface diverges, relative to the axis of symmetry, to a shroud apex; and
the shroud apex is axially offset from the hub apex.

11. The system of claim 8, further comprising a turning vane disposed upstream of the air inlet.

12. The system of claim 8, further comprising:
a plasma flow control actuator coupled to the hub section and disposed between the air inlet and the splitter.

13. The system of claim 8, further comprising an air pump in fluid communication with the scavenge flow path and configured to draw air through the scavenge flow path.

14. An inlet particle separator system for a vehicle engine having an axis of symmetry about which components that comprise the vehicle engine rotate, the inlet particle separator system comprising:
a hub section having a hub outer surface that diverges, relative to the axis of symmetry, to a hub apex;
a shroud section having a shroud inner surface that diverges, relative to the axis of symmetry, to a shroud apex and that surrounds, and is spaced apart from, at least a portion of the hub section to define a main flow passageway between the hub outer surface and the shroud inner surface, the main flow passageway having an air inlet and a cross sectional flow area;
a splitter disposed downstream of the air inlet and extending into the main flow passageway to divide the main flow passageway into a scavenge flow path and an engine flow path; and
an air pump in fluid communication with the scavenge flow path and configured to draw air through the scavenge flow path and the hub suction flow passage,
wherein:
the hub section and the shroud section are configured such that the cross sectional flow area of the main flow passageway decreases downstream of the air inlet to define a throat section,
the throat section is disposed upstream of the hub apex,
the hub section, where the throat section is defined, protrudes in an upstream direction toward the air inlet to define a forward protruding section, and
the shroud apex is axially offset from the hub apex.

15. The system of claim 14, further comprising a turning vane disposed upstream of the air inlet.

16. The system of claim 14, further comprising:
a plasma flow control actuator coupled to the hub section and disposed between the air inlet and the splitter.

17. The system of claim 14, wherein:
the shroud section upstream of the air inlet has a shroud radius ($R_{SHROUD}$) relative to the axis of symmetry;

the hub section upstream of the air inlet has a hub radius ($R_{HUB}$) relative to the axis of symmetry;

a difference radius is defined as $\Delta R = R_{SHROUD} - R_{HUB}$;

a region where the shroud section begins increasing in diameter has a shroud radius of curvature ($R_S$);

the forward protruding section has a hub radius of curvature ($R_H$);

the hub radius of curvature has a center of curvature (C);

the center of curvature (C) of the forward protruding section is disposed at a center of curvature radius ($R_C$) relative to the axis of symmetry; and $R_S/\Delta R$, $R_H/\Delta R$, and $R_C/R_{SHROUD}$ are set to establish desired performance criteria.

18. The system of claim 17, wherein:

$R_S/\Delta R$ is in the range of about 0.07 to about 0.3;

$R_H/\Delta R$ is preferably in the range of about 0.09 to about 0.6; and $R_C/R_{SHROUD}$ is in the range of about 0.7 to about 1.0.

\* \* \* \* \*